United States Patent [19]

Weaver et al.

[11] Patent Number: 4,791,188
[45] Date of Patent: Dec. 13, 1988

[54] CONDENSATION POLYMER CONTAINING THE RESIDUE OF A BENZODIOXYLMETHINE COMPOUND AND SHAPED ARTICLES PRODUCED THEREFROM

[75] Inventors: Max A. Weaver; Wayne P. Pruett, both of Kingsport; Samuel D. Hilbert, Jonesborough, all of Tenn.

[73] Assignee: Eastman Kodak Company, Rochester, N.Y.

[21] Appl. No.: 135,425

[22] Filed: Dec. 21, 1987

[51] Int. Cl.$^4$ .................... C08G 63/76; C08G 73/16
[52] U.S. Cl. ........................................ 528/288; 525/46; 525/445; 528/290; 528/302; 528/303; 528/304; 528/308
[58] Field of Search ................ 525/46, 445; 528/288, 528/290, 302, 303, 304, 308

[56] References Cited

U.S. PATENT DOCUMENTS

| | | | |
|---|---|---|---|
| 4,305,719 | 12/1981 | Zannucci et al. | 8/662 |
| 4,338,247 | 7/1982 | Zannucci et al. | 528/307 |
| 4,340,718 | 7/1982 | Zannucc et al. | 528/128 |
| 4,617,373 | 10/1986 | Pruett et al. | 528/288 |
| 4,617,374 | 10/1986 | Pruett et al. | 528/288 |
| 4,661,566 | 4/1987 | Pruett et al. | 525/445 |
| 4,707,537 | 11/1987 | Pruett et al. | 528/288 |
| 4,749,772 | 6/1988 | Weaver et al. | 528/288 |
| 4,749,773 | 6/1988 | Weaver et al. | 528/288 |
| 4,749,774 | 6/1988 | Weaver et al. | 528/288 |

*Primary Examiner*—John Kight
*Assistant Examiner*—Samuel A. Acquah
*Attorney, Agent, or Firm*—J. Frederick Thomsen; William P. Heath, Jr.

[57] ABSTRACT

Composition useful for molding into articles such as food containers, beverage bottles, cured structural plastics and the like comprising molding grade linear or unsaturated polyester or polycarbonate having reacted therewith or copolymerized therein the residue of one or more benzodioxylmethine compounds having the formula:

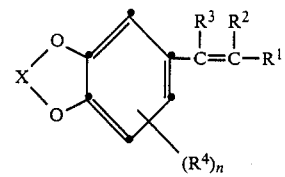

wherein
$R^1$ is cyano, carboxy, alkenyloxycarbonyl or an unsubstituted or substituted alkoxycarbonyl, cycloalkoxycarbonyl or aryloxycarbonyl radical;
$R^2$ is one of the groups specified for $R^1$ or an unsubstituted or substituted aryl, carbamoyl, alkanoyl, cycloalkanoyl, aroyl, alkylsulfonyl, cycloalkylsulfonyl, arylsulfonyl or heterocyclic aryl radical;
$R^3$ is hydrogen or an unsubstituted or substituted alkyl, cycloalkyl or aryl radical;
$R^4$ is hydrogen, alkyl, alkoxy, or halogen;
n is 1 or 2; and
X is an unsubstituted or substituted methylene or ethylene radical; provided the benzodioxolylmethine compound bears at least one substituent that is reactive with one of the monomers from which the condensation polymer is derived, said benzodioxylmethine residue absorbing radiation in the range of about 250 nm to 390 nm and being nonextractable from said polymer and stable under polymer processing conditions.

The benzodioxylmethine residues are present in the polymer as an integral part of the polymer chain and absorb ultraviolet radiation in the range of about 250 to about 390 nm. The residues are nonextractable from the polymer and stable at the conditions at which the polymers are manufactured and processed.

13 Claims, No Drawings

CONDENSATION POLYMER CONTAINING THE RESIDUE OF A BENZODIOXYLMETHINE COMPOUND AND SHAPED ARTICLES PRODUCED THEREFROM

This invention pertains to novel condensation polymers including linear polyesters, unsaturated polyesters and polycarbonates wherein one or more fluorescent benzodioxylmethine moieties have been reacted with or copolymerized (condensed) into the chain or backbone of the polymer. This invention also pertains to fibers and, particularly, to containers, such as those suitable for packaging beverages and foods, manufactured from our novel condensation polymers.

Many products such as certain fruit juices, soft drinks, wines, food products, cosmetics and shampoos are deleteriously affected, i.e., degraded, by ultraviolet (UV) light when packaged in clear plastic containers which pass significant portions of the available light at wavelengths in the range of approximately 250 to 390 nm. It is well known that polymers can be rendered resistant to degradation by UV light by physically blending in such polymers various UV light stabilizers such as benzophenones, benzotriazoles and resorcinol monobenzoates. See, for example, Plastics Additives Handbook, Hanser Publishers, Library of Congress, Catalog No. 83-062289, pp 128-134. Normally, such stabilizers are used in a weight concentration of at least 0.5 percent. Although these stabilizers generally function well to absorb radiation in the range of about 300 to 350 nm, absorbance in the range of 300 to 350 nm is not adequate to protect comestibles subject to UV light degradation packaged in clear plastic, i.e., essentially transparent plastics. The stabilizers present in many of the known stabilized polymer compositions can be extracted from the polymer by solvents such as acids, alcohols and the like present in foods or beverages packaged within the stabilized polymers. Furthermore, many compounds used to stabilize polymers are not stable at high temperatures and decompose under the conditions at which polyesters are manufactured or processed. Decomposition of such stabilizers frequently causes yellow discoloration of the polymer and results in the polymer containing little, if any, of the stabilizer.

U.S. Pat. Nos. 4,305,719, 4,338,247, 4,340,718 and 4,617,374 disclose the concept of reacting benzylidene-type methine compounds capable of absorbing UV light with or into polyesters. These patents do not, however, disclose the use of the benzodioxylmethine compounds described hereinafter to obtain the compositions provided by this invention. Furthermore, the presence of the benzodioxylmethine compounds in the condensation polymers imparts a bright, blue-white fluorescence to the polymers upon exposure to long wavelength ultra-violet light making the polymers appear whiter.

The novel polymer composition provided by our invention comprises molding or fiber grade condensation polymer having copolymerized therein or reacted therewith an ultra-violet light-absorbing amount of the residue of a benzodioxylmethine compound or mixture of benzodioxylmethine compounds having the formula:

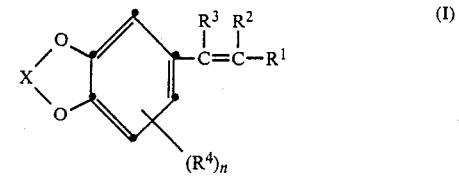

wherein
- $R^1$ is cyano, carboxy, alkenyloxycarbonyl, or a substituted or unsubstituted alkoxycarbonyl, cycloalkoxycarbonyl or aryloxycarbonyl radical;
- $R^2$ is one of the groups specified for $R^1$ or an unsubstituted or substituted aryl, carbamoyl, alkanoyl, cycloalkanoyl, aroyl, alkylsulfonyl, cycloalkylsulfonyl, arylsulfonyl or heterocyclic aryl radical;
- $R^3$ is hydrogen or an unsubstituted or substituted alkyl, cycloalkyl or aryl radical;
- $R^4$ is hydrogen, alkyl, alkoxy or halogen;
- $R$ is 1 or 2; and
- $X$ is an unsubstituted or substituted methylene or ethylene radical; provided the benzodioxylmethine compound bears at least one substituent that is reactive with one of the monomers from which the condensation polymer is derived, said benzodioxylmethine residue absorbing radiation in the range of about 250 nm to about 390 nm, and being nonextractable from said polymer and stable under the polymer processing conditions.

The alkyl and alkoxy moieties of the groups recited in the definitions of $R^1$, $R^2$, and $R^3$ can be unsubstituted or substituted alkyl and alkoxy of up to 12 carbon atoms. Hydroxy, alkoxy, halogen, alkanoyloxy, alkoxycarbonyl, cyano, aryl, aryloxy, cycloalkyl, cycloalkoxy and alkylthio are examples of the substituents which may be present on the substituted alkyl groups and alkoxy moieties which $R^1$, $R^2$, $R^3$ can represent. The cycloalkyl moieties of the groups recited in the definitions of $R^1$, $R^2$, and $R^3$ can be cycloalkyl of 5 to 7 carbon atoms which may be substituted with alkyl or any of the substituents mentioned hereinabove. The carbamoyl groups which $R^2$ can represent may be unsubstituted or substituted carbamoyl such as N-alkylcarbamoyl, N,N-dialkylcarbamoyl, N-cycoalkylcarbamoyl, N-alkyl-N-cycloalkylcarbamoyl, N-arylcarbamoyl, N-alkyl-N-arylcarbamoyl and the like.

The aryl moieties of the groups recited in the definitions of $R^1$, $R^2$, and $R^3$ can be unsubstituted or substituted carbocyclic aryl containing 6 to 12 carbon atoms. Examples of the substituents which may be present on the aryl groups include alkyl, substituted alkyl and the substituents set forth in the preceding paragraph. Pyrolyl, pyridyl, pyrimidyl, 2-benzothiazolyl, 2-benzoxazolyl, 2-benzimidazolyl, 2-thienyl, 2-furanyl, 1,3,4-thiadiazol-2-yl, 1,2,4-thiadiazol-2-yl and groups having the structure:

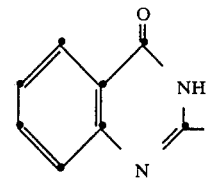

are examples of the unsubstituted heterocyclic aryl residues which each $R^2$ may represent.

Further descriptions and examples of the

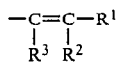

residue of the benzodioxylmethine compounds of formula (I) are set forth in U.S. Pat. Nos. 4,338,247, 4,340,718, 4,617,374 and 4,661,566, the disclosures of which are incorporated herein by reference.

The alkyl and alkoxy groups which $R^4$ may represent preferably contain up to 4 carbon atoms such as, for example, methyl, ethyl, propyl, 2-methylpropyl, butyl, methoxy, ethoxy, butoxy and the like. Chloro and bromo are examples of the halogen substituents which $R^4$ may represent. The methylene or ethylene radicals represented by X may be unsubstituted or substituted, for example, with alkyl, e.g., 1,2-propanediyl, alkoxy, e.g., ethoxyethylene, or aryl, e.g., phenylethylene.

As stated hereinabove, the benzodioxylmethine compounds must bear or contain at least one substituent that is reactive with one of the monomers from which the condensation polymer is derived. Examples of such reactive substituents include carbonyl halides such as carbonyl chloride, carboxy, alkoxycarbonyl, alkenyloxycarbonyl, cycloalkoxycarbonyl, aryloxycarbonyl, amino, hydroxy, esterified hydroxy, i.e., acyloxy, groups such as carboxylic acid esters, e.g., alkanoyloxy, cycloalkanoyloxy and aroyloxy, carbamic acid esters, e.g., N-alkyl-carbamoyloxy and N-arylcarbamoyloxy; and carbonate esters, e.g., ethoxycarbonyloxy. The benzodioxylmethine residue may be incorporated into or on the polymer chain by reacting one or more benzodioxylmethine compounds of formula (I) with the monomers, with a prepolymer or with the final polymer. As those skilled in the art will appreciate, when the reactive substituent or substituents are alkoxycarbonyl, alkenyloxycarbony, cycloalkoxycarbonyl, aryloxycarbonyl, or acyloxy, the alkyl, alkenyl, cycloalkyl and aryl residues and the acid residues of the acyloxy substituents are displaced or removed from the benzodioxylmethine compound upon reaction with the polymer or polymer precursor. Thus, those residues are not important to the benzodioxylmethine residue component of our novel compositions.

A preferred embodiment of our invention is a linear polyester composition having copolymerized therein or reacted therewith the residue of a benzodioxylmethine compound having the formula

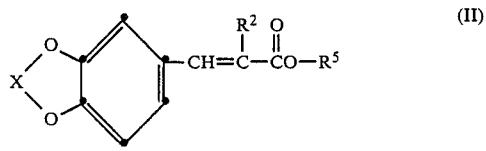

wherein
$R^2$ is cyano, carboxy, alkoxycarbonyl, cycloalkoxycarbonyl, aryloxycarbonyl, acyl, especially alkanoyl, aryl, heterocyclic aryl, alkylsulfonyl, arylsulfonyl, aroyl, carbamoyl or carbamoyl substituted with alkyl, aryl or cycloalkyl;
$R^5$ is hydrogen, alkyl, cycloalkyl or aryl; and
X is methylene or ethylene.

The use of compounds of formula (II) wherein $R^2$ is cyano or alkoxycarbonyl and $R^5$ is alkyl is especially preferred.

The benzodioxylmethine compounds of formula (I) can be prepared using known procedures by reacting an intermediate carbonyl compound (III) with an active methylene compound under Knovenagel reaction conditions:

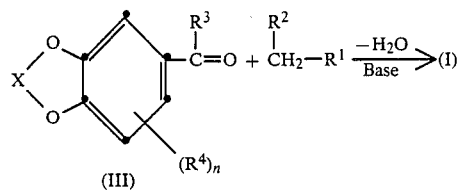

Lower alkanols such as methanol, ethanol and isopropanol are usually suitable solvents. When $R^3$ is not hydrogen, it may be advantageous to perform the reactions in water-immiscible solvents such as benzene or toluene to allow the water formed during the reaction to be azeotropically removed. Bases such as piperidine, piperidine acetate, sodium acetate and pyridine are effective in promoting the condensation reaction.

The polyesters which may be used in the preparation of the compositions of our invention include linear, thermoplastic, crystalline or amorphous polyesters produced by conventional polymerization techniques from one or more diols and one or more dicarboxylic acids. The polyesters normally are molding or fiber grade and have an inherent viscosity (IV) of about 0.4 to about 1.2. The preferred polyesters comprise at least about 50 mole percent terephthalic acid residues and at least about 50 mole percent ethylene glycol and/or 1,4-cyclohexanedimethanol residues. Particularly preferred polyesters are those containing from about 75 to 100 mole percent terephthalic acid residues and from about 75 to 100 mole percent ethylene glycol residues.

The unsaturated, curable polyesters which may be used in our novel compositions are the polyesterification products of one or more glycols and one or more unsaturated dicarboxylic acids or their anhydrides. Typical of the unsaturated polyesters is the polyesterification product of (a) 1,4-cyclohexanedimethanol and/or 2,2-dimethyl-1,3-propanediol and optionally an additional dihydric alcohol, such as ethylene glycol, and (b) maleic acid or fumaric acid and an aromatic dicarboxylic acid, which when crosslinked with an ethylenically-unsaturated monomer, e.g., styrene, produces a cured polyester resin which has, for example, high thermal resistance, high heat distortion values, excellent electrical and mechanical properties, and excellent resistance to chemicals.

Solutions of such unsaturated polyester resins in an ethylenically-unsaturated monomer such as styrene commonly are referred to as polyester resins.

The unsaturated polyester resins may be prepared in the presence of gelation inhibitors such as hydroquinone or the like, which are well known in the art of polyesterification. The esterification may be carried out, for example, under an inert blanket of gas such as nitrogen in a temperature range of 118°-220° C. for a period of about 6-20 hours until an acid number below 100 and preferably below 50 is obtained, based on milliequivalents of KOH necessary to neutralize 1 gram of the unsaturated polyester. The resulting polyester may be subsequently copolymerized, cross-linked, or cured with "curing amounts" of any of the well-known ethylenically unsaturated monomers used as solvents for the polyester. Examples of such monomers include styrene, alpha-methyl styrene, vinyl toluene, divinyl benzene, chlorostyrene, and the like as well as mixtures thereof. Typically, the mole ratio of such unsaturated monomer to the unsaturated moiety (e.g., maleic acid residue) in the polyester is from about 0.5 to about 3.0, although the "curing amounts" of such monomer can be varied from these ratios.

It is preferred that the unsaturated polyester be prepared from one or more dihydric alcohols, fumaric or maleic acid or mixtures thereof, and up to about 60 mole percent of total acid component of o-phthalic, iso-phthalic or terephthalic acids or mixtures thereof. Preferred for the dihydric alcohol component is one or a mixture of propylene glycol, neopentyl glycol, 2,2,4-trimethyl-1,3-pentanediol, ethylene glycol, or diethylene glycol. A specific preferred unsaturated polyester is prepared from about 75 to 100 mole percent propylene glycol, and as the acid component, from, about 75 to 100 mole percent o-phthalic and maleic acids in a mole ratio of from about ½ to about 2/1. Typical of these unsaturated polyesters are those disclosed, for example, in U.S. Pat. No. 4,359,570 incorporated herein by reference.

The diol components of the described polyesters may be selected from ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, X,8-bis(hydroxymethyl)-tricyclo-[5.2.1.0]-decane wherein X represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms.

The acid components (aliphatic, alicyclic, or aromatic dicarboxylic acids) of the linear polyester are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalene-dicarboxylic acid and the like. In the polymer preparation, it is often preferable to use a functional acid derivative thereof such as the dimethyl, diethyl, or dipropyl ester of the dicarboxylic acid. The anhydrides or acid halides of these acids also may be employed where practical.

Typical polycarbonates useful herein are disclosed in Kirk-Othmer Encyclopedia of Chemical Technology, third edition, Volume 18, pages 479–494, incorporated herein by reference.

The novel polymer compositions provided by this invention are useful in the manufacture of containers or packages for comestibles such as beverages and food. By the use of known heat-setting techniques, certain of the polyesters are, in terms of color, I.V. and heat distortion, stable at temperatures up to about 100° C. Such stability characteristics are referred to herein as "hot-fill" stability. Articles molded from these polyesters exhibit good thin-wall rigidity, excellent clarity and good barrier properties with respect to moisture and atmospheric gases, particularly carbon dioxide and oxygen.

The linear polyesters most preferred for use in articles having "hot-fill" stability comprise poly(ethylene terephthalate), poly(ethylene terephthalate) wherein up to 5 mole percent of the ethylene glycol residues have been replaced with residues derived from 1,4-cyclohexanedimethanol and poly(ethylene 2,6-naphthalenedicarboxylate), wherein the polyesters have been sufficiently heat set and oriented by methods well known in the art to give a desired degree of crystallinity. By definition, a polymer is "hot-fill" stable at a prescribed temperature when less than 2% change in volume of a container manufactured therefrom occurs upon filling the same with a liquid at the temperature. For the manufacture of blow-molded beverage bottles, the most preferred polyesters have an I.V. of 0.65 to 0.85, and a Tg of >70° C., and film sections cut from the bottle have a Water Vapor Transmission Rate of 1.5 to 2.5 g mils/100 in.$^2$—24 hours, a Carbon Dioxide Permeability of 20–30 cc. mils/100 in.$^2$—24 hours—atm., and an Oxygen Permeability of 4–8 cc. mils/100 in.$^2$—24 hours—atm. The Tg is determined by Differential Scanning Calorimetry at a scan rate of 20 Centigrade Degrees/min., the Oxygen Permeability by the standard operating procedure of a MOCON OXTRAN 100 instrument of Modern Controls, Inc., of Elk River, Minn., and the Carbon Dioxide Permeability by the standard operating procedure of a MOCON PERMATRAN C II, also of Modern Controls.

The UV absorbing concentration of the residue of the benzodioxylmethine compound in the condensation polymer can be varied substantially, e.g., from 10 to 100,000 ppm or higher, depending, for example, on the intended function of the UV-absorbing residue and/or the end use for which the polymer composition is intended. When the polymer composition is to be used in the fabrication of relatively thin-walled containers to screen UV light in the range of about 250 to 390 nm, the concentration of the residue of the benzodioxylmethine compound normally will be in the range of about 50 to 1500 ppm (parts by weight per million parts by weight polymer) with the range of about 200 to 800 ppm being especially preferred.

When the concentration of the residue of the benzodioxylmethine compound is increased to higher levels such as 5,000 ppm (0.5 weight percent) or higher, the polymers exhibit improved resistance to weathering and when these polymers per se or fibers thereof are dyed with disperse dyes, at a concentration, for example, of from about 0.01 to about 5.0% based on weight of polymer or fiber, many dyes exhibit increased lightfastness. Such disperse dyes are shown, for example, in U.S. Pat. Nos. 4,305,719; 2,746,952; 2,746,953; 2,757,173; 2,763,668; 2,771,466; 2,773,054; 2,777,863; 2,785,157; 2,790,791; 2,798,081; 2,805,218; 2,822,359; 2,827,450; 2,832,761; 2,852,504; 2,857,371; 2,865,909; 2,871,231; 3,072,683; 3,079,373; 3,079,375; 3,087,773; 3,096,318; 3,096,332; 3,236,843; 3,254,073; 3,349,075; 3,380,990; 3,386,990; 3,394,144; 3,804,823; 3,816,388; 3,816,392; 3,829,410; 3,917,604; 3,928,311; 3,980,626; 3,998,801; 4,039,522; 4,052,379; and 4,140,683, the disclosures of which are incorporated herein by reference.

Polymer compositions containing substantially higher amounts, e.g., from about 2.0 to 10.0 weight percent, of the residue of one or more of the benzodioxylmethine compounds described herein may be used as polymer concentrates. Such concentrates may be blended with the same or different polymer according to conventional procedures to obtain polymer compositions which will contain a predetermined amount of the residue or residues in a non-extractable form. In the preparation of these highly loaded, polymer composition concentrates the residue preferably is divalent and thus is derived from a difunctional benzodioxylmethine compound such as the compound of Example 45.

The preparation of the benzodioxylmethine compounds and their use in preparing the compositions of our invention are further illustrated by the following examples.

EXAMPLE 1

Piperonal (1,3-benzodioxole-5-carboxaldehyde) (3.0 g, 0.02 mol), methyl cyanoacetate (2.0 g, 0.02 mol), methanol (25 mL), and piperidine (5 drops) are mixed and heated at reflux for 1 hour. Upon cooling, a pale, greenish-yellow solid precipitates. The solids are collected by filtration, washed with methanol and dried in air. The yield is 4.2 g of product which mass spectroscopy analysis confirms is methyl 3-(1,3-benzodioxol-5-yl)-2-cyano-2-propenoate having the structure:

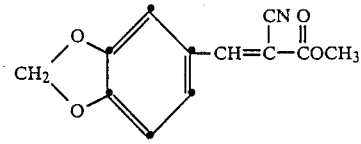

The product is highly fluorescent under long wavelength ultraviolet light and emits a desirable blue-white light. When dissolved in methylene chloride, the compound has an absorption maximum ($\lambda$ max) at 362 nm in the ultra-violet spectrum.

EXAMPLE 2

Methyl 3-(1,4-benzodioxan-6-yl)-2-cyano-2-propenoate is prepared by reacting 1,4-benzodioxan-6-carboxaldehyde (0.82 g, 0.005 mol) with methyl cyanoacetate (0.50 g, 0.005 mol) and isolated according to the procedures described in Example 1. When the product is dissolved in methylene chloride, an absorption maximum ($\lambda$ max) is observed at 356 nm. The following structure of the compound is confirmed by mass spectroscopy analysis:

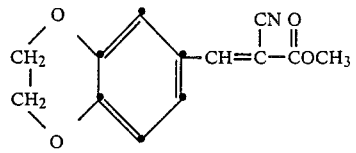

Additional examples of benzodioxylmethine compounds which may be used in the preparation of our novel polymer compositions are set forth in the following Table. These compounds may be prepared according to the procedures described above and conform to formula (I). The numbers used to designate the position(s) of any $R^4$ substituents varies depending on whether X is a methylene or ethylene radical. When X is a substituted ethylene group, the ethylene carbon atom most proximal to the methine group [—C($R^3$)=C($R^1$)($R^2$)] appears first in the X column. For example, the compound of Example 33 has the structure

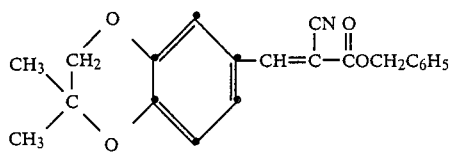

| Ex. | $R^1$ | $R^2$ | $R^3$ | $R^4$ | X |
|---|---|---|---|---|---|
| 3 | —COOH | —CN | H | H | —CH$_2$— |
| 4 | —COOCH$_3$ | —CN | —CH$_3$ | H | —CH$_2$— |
| 5 | —COOC$_2$H$_5$ | —CN | —C$_6$H$_5$ | H | —CH$_2$— |
| 6 | —COOCH$_2$CH(CH$_3$)$_2$ | —CN | —C$_6$H$_{11}$ | H | —CH$_2$— |
| 7 | —COOCH$_2$CH$_2$OH | —CN | H | 6-CH$_3$ | —CH$_2$— |
| 8 | —COOCH$_2$CH$_2$Cl | —CN | H | 4-CH$_3$ | —CH$_2$— |
| 9 | —COOCH$_3$ | —CN | H | H | —C(CH$_3$)$_2$— |
| 10 | —COOCH$_2$CH$_2$OCH$_3$ | —CN | H | H | —C(CH$_3$)(C$_6$H$_5$)— |
| 11 | —COOCH$_2$CH$_2$C$_6$H$_5$ | —CN | H | H | —C(C$_2$H$_5$)$_2$— |
| 12 | —COO(CH$_2$)$_3$CH$_3$ | —CN | H | H | —C(C$_2$H$_5$)(CH$_2$CH$_2$CH$_2$CH$_3$)— |
| 13 | —COOCH$_2$C$_6$H$_5$ | —CN | H | H | —C(CH$_2$CH$_2$CH$_2$CH$_3$)$_2$— |
| 14 | —COOCH$_2$C$_6$H$_{11}$ | —CN | H | H | —CH(CH$_3$)— |
| 15 | —COOCH$_2$OC$_6$H$_5$ | —CN | H | H | —CH(C$_6$H$_4$—4-CH$_3$)— |
| 16 | —COO(CH$_2$)$_3$OH | —CN | H | H | —CH(C$_6$H$_4$—3-CH$_3$)— |
| 17 | —COO(CH$_2$CH$_2$O)$_2$H | —CN | H | 6-OCH$_3$ | —CH$_2$— |
| 18 | —COO(CH$_2$CH$_2$O)$_2$CH$_3$ | —CN | H | 7-OCH$_3$ | —CH$_2$— |
| 19 | —COOCH$_2$CH$_2$OC$_6$H$_5$ | —CN | H | 4-Br—6-OCH$_3$ | —CH$_2$— |
| 20 | —COOC$_6$H$_{11}$ | —CN | H | 4,7-di-OCH$_3$ | —CH$_2$— |
| 21 | —COOC$_6$H$_5$ | —CN | H | 7-OC$_2$H$_5$ | —CH$_2$— |
| 22 | —COOCH$_2$C$_6$H$_4$—4-CH$_2$OH | —CN | H | 4-OCH$_3$ | —CH$_2$— |
| 23 | —COOCH$_2$CH$_2$CN | —CN | H | 6-Cl | —CH$_2$— |
| 24 | —COOCH$_2$C$_6$H$_{10}$—4-CH$_2$OH | —CN | H | 7-Br | —CH$_2$— |
| 25 | —COOCH$_2$CH$_2$NHCOCH$_3$ | —CN | H | 4-Cl | —CH$_2$— |
| 26 | —COOCH$_2$CH$_2$OOCCH$_3$ | —CN | H | 6-CH$_3$ | —CH$_2$— |
| 27 | —COOH | —CN | —CH$_3$ | H | —CH$_2$— |
| 28 | —COOH | —CN | H | H | —CH$_2$CH$_2$— |
| 29 | —COOCH$_3$ | —CN | —CH$_3$ | H | —CH$_2$CH$_2$— |
| 30 | —COOC$_2$H$_5$ | —CN | —C$_2$H$_5$ | H | —CH$_2$CH$_2$— |
| 31 | —COOC$_6$H$_{11}$ | —CN | —C$_6$H$_{11}$ | H | —CH$_2$CH$_2$— |
| 32 | —COOCH$_2$CH$_2$CN | —CN | H | H | —CH$_2$CH(CH$_3$)— |
| 33 | —COOCH$_2$C$_6$H$_5$ | —CN | H | H | —CH$_2$C(CH$_3$)$_2$— |
| 34 | —COOCH$_2$C$_6$H$_{11}$ | —CN | H | H | —CH(C$_6$H$_5$)CH(C$_2$H$_5$)— |

-continued

| Ex. | R¹ | R² | R³ | R⁴ | X |
|---|---|---|---|---|---|
| 35 | —COOC₆H₁₁ | —CN | H | 7-CH₃ | —CH₂CH₂— |
| 36 | —COOC₆H₅ | —CN | H | 8-CH₃ | —CH₂CH₂— |
| 37 | —COOCH₂C₆H₁₀—4-CH₂OH | —CN | H | 5-OCH₃ | —CH₂CH₂— |
| 38 | —COOCH₂CH(CH₃)₂ | —CN | H | 5-C₂H₅ | —CH₂CH₂— |
| 39 | —COOCH₂CH₂OOCCH₃ | —CN | H | 5-Cl | —CH₂CH₂— |
| 40 | —COOCH₂CH₂OC₆H₅ | —CN | H | 5-Br | —CH₂CH₂— |
| 41 | —COOCH₂CH(OH)CH₂OH | —CN | H | 5,8-di-OCH₃ | —CH₂CH₂— |
| 42 | —COOCH₃ | —CN | H | H | —CH₂CH(OCH₃)— |
| 43 | —COOC₂H₅ | —CN | H | H | —CH₂CH[(CH₂)₃CH₃]— |
| 44 | —COOCH₃ | —CN | —CH₃ | 5-CH₃ | —CH₂CH₂— |
| 45 | —COOC₂H₅ | —COOC₂H₅ | H | H | —CH₂CH₂ |
| 46 | —C=N—o-C₆H₃—(5-COOCH₃)—O | —CN | H | H | —CH₂— |
| 47 | —C=N—o-C₆H₃—(5-COOH)—O | —CN | H | H | —CH₂CH₂— |
| 48 | —C=N—o-C₆H₃—(5-COOCH₃)—S | —CN | H | H | —CH₂— |
| 49 | —C=N—o-C₆H₃—(5-COOH)—NH | —CN | H | H | —CH₂— |
| 50 | —C₆H₄—4-COOCH₃ | —CN | H | H | —CH₂CH₂— |
| 51 | —C=N—o-C₆H₃—(5-COOCH₃)—O | —COOC₂H₅ | H | H | —CH₂— |
| 52 | —C=N—o-C₆H₃—(5-COOCH₃)—O | —COOH | H | H | —CH₂CH₂— |
| 53 | —COC₆H₅ | —COOC₂H₅ | H | H | —CH₂— |
| 54 | —CONHCH₂CH₂OH | —CN | H | H | —CH₂— |
| 55 | —CONHCH₂C₆H₁₀—4-CH₂OH | —CN | H | H | —CH₂CH₂— |
| 56 | —CONHC₆H₃—3,5-di-COOCH₃ | —CN | H | H | —CH₂CH₂— |
| 57 | —CONHC₆H₃—2-OCH₃—5-SO₂NHCH₂CH₂OH | —CN | H | H | —CH₂— |
| 58 | —SO₂CH₃ | —COOC₂H₅ | H | H | —CH₂— |
| 59 | —SO₂C₆H₄—4-CH₂OH | —COOCH₃ | H | H | —CH₂— |
| 60 | —SO₂C₆H₄—4-OCH₂CH₂OH | —CN | H | H | —CH₂CH₂— |
| 61 | —SO₂C₆H₁₀—4-OCH₂CH₂OH | —CN | H | H | —CH₂CH₂— |
| 62 | —SO₂CH₂CH(OH)CH₂OH | —CN | H | H | —CH₂— |
| 63 | —SO₂(CH₂)₃OH | —CN | H | H | —CH₂— |
| 64 | —SO₂C₆H₃—4-OCH₃—3-COOCH₃ | —CN | H | H | —CH₂— |
| 65 | —SO₂C=N—o-C₆H₃—5-(COOCH₃)—O | —CN | H | H | —CH₂— |
| 66 | —COC(CH₃)₃ | —COOCH₃ | H | H | —CH₂CH₂— |
| 67 | —COC=CHCH=CH—S | —COOCH₃ | H | H | —CH₂— |
| 68 | —C=NC(CH₃)=C(COOC₂H₅)—S | —COOC₂H₅ | H | H | —CH₂CH₂— |
| 69 | —CONHC₆H₄—4-SCH₂CH₂OH | —COOCH₃ | H | H | —CH₂CH₂— |
| 70 | —CON(CH₃)CH₂CH₂OH | —COOCH₃ | H | H | —CH₂— |
| 71 | —CONCH₂CH₂OCH₂CH₂ | —COOC₂H₅ | H | H | —CH₂— |
| 72 | —CON(CH₃)₂ | —COOC₂H₅ | H | H | —CH₂— |
| 73 | —CONHC₆H₅ | —COOC₂H₅ | H | H | —CH₂— |
| 74 | —COC=CHCH=CHO | —COOC₂H₅ | H | H | —CH₂— |
| 75 | —C=N—o-C₆H₃—7-(COOCH₃)—C(O)NH | —CN | H | H | —CH₂— |

-continued

| Ex. | R¹ | R² | R³ | R⁴ | X |
|-----|----|----|----|----|---|
| 76 | —C=NN=C(COOCH₃)—S | —CN | H | H | —CH₂CH₂— |
| 77 | —C=NN=C(C₆H₄—4-COOCH₃)—O | —CN | H | H | —CH₂— |
| 78 | —C=NCH=CHCH=N | —COOCH₃ | H | H | —CH₂— |
| 79 | —C₆H₄—4-CN | —COOCH₃ | H | H | —CH₂— |
| 80 | —C₆H₃—3,5-di-COOCH₃ | —CN | H | H | —CH₂— |

EXAMPLE 81

The following materials are placed in a 500-mL, three-necked, round-bottom flask:
 97 g (0.5 mol) dimethyl terephthalate
 62 g (1.0 mol) ethylene glycol
 0.00192 g Ti from a n-butanol solution of acetyl-triisopropyl titanate
 0.0053 g Mn from an ethylene glycol solution of manganese acetate
 0.0216 g Antimony trioxide
 0.0072 g Co from an ethylene glycol solution of cobaltous acetate The flask is equipped with a nitrogen inlet, stirrer, vacuum outlet, and condensing flask. The flask and contents are heated at 200° C. in a Belmont metal bath for 60 minutes and at 210° C. for 75 minutes with a nitrogen sweep over the reaction mixture. Then 1.57 mL of an ethylene glycol slurry of a mixed phosphorus ester composition (Zonyl A) which contains 0.012 g phosphorus is added. The temperature of the bath is increased to 230° C. At 230° C. methyl 3-(1,3-benzodioxol-5-yl)-2-cyano-2-propenoate (0.0384 g) prepared in Example 1 is added to the flask. Five minutes after this addition, a vacuum with a slow stream of nitrogen bleeding in the system is applied over a five-minute period until the pressure is reduced to 200 mm Hg. The flask and contents are heated at 230° C. under a pressure of 200 mm Hg for 25 minutes. The metal bath temperature is increased to 270° C. At 270° C. the pressure is reduced slowly to 100 mm Hg. The flask and contents are heated at 270° C. under a pressure of 100 mm Hg for 30 minutes. The metal bath temperature is increased to 285° C. and the pressure is reduced slowly to 4.5 mm Hg. The flask and contents are heated at 285° C. under pressure of 4.5 mm Hg for 25 minutes. Then the pressure is reduced to 0.25 mm Hg and polycondensation is continued for 40 minutes. The flask is removed from the metal bath and is allowed to cool in a nitrogen atmosphere while the polymer crystallizes. The resulting polymer has an inherent viscosity of 0.56 measured in a 60/40 ratio by weight of phenol/tetrachloroethane at a concentration of 0.5 g per 100 mL. A UV spectrum of an amorphous film of the polyester showed a strong absorption peak at 370 nm.

EXAMPLE 82

The procedure described in Example 81 is repeated using 0.0384 g (440 ppm) of methyl 3-(1,4-benzodioxan-6-yl)-2-cyano-2-propenoate of Example 2 instead of the benzodioxylmethine compound used in Example 81. The resulting polymer is white and has an inherent viscosity of 0.53. An amorphous 14 ml thick film molded from this polymer transmits less than 10% light from 250 to 385 nm whereas a 14 mil film prepared from a like polyester without the copolymerized absorber transmits less than 10% light from 250 to only 320 nm.

EXAMPLE 83

The procedure described in Example 81 is repeated using 0.0384 g (400 ppm) of the compound of Example 45 instead of the benzodioxylmethine compound used in Example 81. The resulting polymer has an inherent viscosity of 0.55 measured in a 60/40 ratio by weight of phenol/tetrachloroethane at a concentration of 0.5 g per 100 mL. An amorphous 13.5 mil thick molded from this polymer shows a strong absorption peak with a maximum at 330 nm.

The inherent viscosities (I.V. of the copolyesters described herein are determined according to ASTM D2857-70 procedure in a Wagner Viscometer of Lab Glass Inc. of Vineland, N.J., having a ½ mL capillary bulb, using a polymer concentration of 0.5%, by weight, in 60/40, by weight, phenol/tetrachloroethane solvent. The procedure comprises heating the polymer/solvent system at 120° C. for 15 minutes to enhance dissolution of the polymer, cooling the solution to 25° C. and measuring the time of flow at 25° C. The I.V. is calculated from the equation:

$$\{\eta\}\ 25°\ C. = \frac{\ln \frac{t_s}{t_o}}{C\ 0.50\%}$$

where:
 $\{n\}$ = Inherent viscosity at 25° C. at a polymer concentration of 0.5 g/100 mL of solvent;
 Ln = Natural logarithm;
 $t_s$ = Sample flow time;
 $t_o$ = Solvent-blank flow time; and
 C = Concentration of polymer in grams per 100 mL of solvent = 0.50

The nonextractabilities of the benzodioxylmethine residues described herein are determined as follows:

All extractions are done in glass containers with distilled solvents under the time and temperature conditions described below. The sample form is ½ inch × 2½ inch segments cut from the cylindrical side wall portion of 2-liter bottles. All samples are washed with cold solvent to remove surface contaminants and are exposed using 200 mL solvent 100 in.² surface area (2 mL/in.²).

Solvent blanks are run under the same extraction conditions without polymer. In most cases samples were extracted, spiked, with a known amount of additive as a control, and analyzed in duplicates. The solvents employed and the extraction conditions for each solvent are:

1. Water. The samples at room temperature are added to solvent and heated at 250° F. for 2 hours. Half of the samples are then analyzed and the remainder are placed in a 120° F. oven for 30 days.

2. 50% Ethanol/Water. The samples at room temperature are added to the solvent at room temperature, placed in an oven at 120° F. and analyzed after 24 hours. Another set of samples is aged for 30 days at 120° F. and then analyzed.

3. Heptane. The samples at room temperature are added to solvent at room temperature and heated at 150° F. for 2 hours. Part of the samples are cooled to room temperature and analyzed spectrophotometrically and the remainder are allowed to age at 120° F. for 30 days before analysis.

Any suitable analytical technique and apparatus may be employed to determine the amount of benzodioxylmethine residue extracted from the polymer.

The invention has been described in detail with particular reference to preferred embodiments thereof, but it will be understood that variations and modifications can be effected within the spirit and scope of the invention.

We claim:

1. A composition comprising molding or fiber grade condensation polymer having copolymerized therein or reacted therewith the residue of a benzodioxylmethine compound or mixture of benzodioxylmethine compounds of the formula:

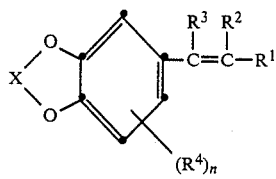

wherein
   $R^1$ is cyano, carboxy alkenyloxycarbonyl or an unsubstituted or substituted alkoxycarbonyl, cycloalkoxycarbonyl or aryloxycarbonyl radical;
   $R^2$ is one of the groups specified for $R^1$ or an unsubstituted or substituted aryl, carbamoyl, alkanoyl, cycloalkanoyl, aroyl, alkylsulfonyl, cycloalkylsulfonyl, arylsulfonyl or heterocyclic aryl radical;
   $R^3$ is hydrogen or an unsubstituted or substituted alkyl, cycloalkyl or aryl radical;
   $R^4$ is hydrogen, alkyl, alkoxy, or halogen;
   n is 1 or 2; and
   X is an unsubstituted or substituted methylene or ethylene radical; provided the benzodioxylmethine compound bears at least one substituent that is reactive with one of the monomers from which the condensation polymer is derived, said benzodioxylmethine residue absorbing radiation in the range of about 250 nm to 390 nm and being nonextractable from said polymer and stable under polymer processing conditions.

2. A composition according to claim 1 wherein the polymer is a linear polyester having copolymerized therein a total of from about 200 to 800 ppm of the residue of the benzodioxylmethine·compound or the mixture of benzodioxylmethine compounds.

3. A composition according to claim 1 wherein the polymer is a linear polyester having copolymerized therein a total of from about 50 to 1,500 ppm of a benzodioxylmethine compound or mixture of benzodioxylmethine compounds of formula:

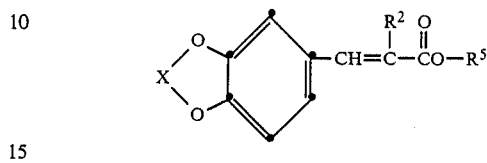

wherein
   $R^2$ is cyano, carboxy, alkoxycarbonyl, cycloalkoxycarbonyl, aryloxycarbonyl, aryl, acyl, heterocyclic aryl, alkylsulfonyl, arylsulfonyl, aroyl, carbamoyl or carbamoyl substituted with alkyl, cycloalkyl or aryl;
   $R^5$ is hydrogen, alkyl, cycloalkyl or aryl; and
   X is methylene or ethylene.

4. A composition according to claim 3 wherein the total amount of benzodioxylmethine residue present is from about 200 to about 800 ppm.

5. A composition according to claim 3 wherein $R^2$ is cyano; and
   $R^5$ is alkyl.

6. A composition according to claim 3 wherein $R^2$ is alkoxycarbonyl; and $R^5$ is alkyl.

7. The composition of any of claim 1, 2, or 3 wherein the polyester acid moiety is comprised of at least about 50 mol % terephthalic acid residue, and the glycol moiety at least about 50 mol % ethylene glycol or 1,4-cyclohexanedimethanol residue, and the polyester contains a total of from about 2 to about 1,500 ppm of one or a mixture of the benzodioxylmethine moieties.

8. The composition of any of claims 1, 2, or 3 wherein the polyester is comprised of from about 75 to 100 mol % terephthalic acid residue and from about 75 to 100 mol % ethylene glycol residue.

9. The composition of claim 1 wherein the polymer is unsaturated polyester having an acid moiety comprised of fumaric or maleic acid or mixtures thereof and up to about 60 mol % of one or a mixture of o-phthalic, isophthalic, or terephthalic acids, and having a glycol moiety comprised of one or a mixture of propylene glycol, neopentyl glycol, 2,2,4-trimethyl-1,3-pentanediol, ethylene glycol or diethylene glycol.

10. The composition of claim 9 wherein the acid moiety is comprised of from about 75 to 100 mol % o-phthalic acid and maleic acid in a mole ratio of from about ½ to about 2/1, and the glycol moiety is comprised of from about 75 to 100 mol % propylene glycol.

11. The composition of claim 9 containing a curing amount of an ethylenically unsaturated monomer.

12. A formed article of the composition of any of claims 1, 2, or 3.

13. A composition according to claim 1 wherein the polymer is a linear polyester having reacted therein a total of about 2.0 to 10.0 weight percent of the residue of a difunctional benzodioxylmethine compound or mixture of compounds of the formula set forth in claim 1.

* * * * *